United States Patent [19]

Yamaguchi

[11] Patent Number: 4,794,673
[45] Date of Patent: Jan. 3, 1989

[54] CORD FASTENER AND METHOD FOR MANUFACTURE THEREOF

[75] Inventor: Mitsuhiro Yamaguchi, Nishinomiya, Japan

[73] Assignee: Morito Co., Ltd., Osaka, Japan

[21] Appl. No.: 94,153

[22] Filed: Sep. 8, 1987

[30] Foreign Application Priority Data

Apr. 30, 1987 [JP] Japan .................. 62-107998

[51] Int. Cl.⁴ .......................................... F16G 11/00
[52] U.S. Cl. ................................ 24/115 G; 24/543
[58] Field of Search ............ 24/115 G, 115 H, 136 L, 24/543, 117, 118, 140, 147

[56] References Cited

U.S. PATENT DOCUMENTS

| | | | |
|---|---|---|---|
| 2,524,649 | 10/1950 | Buhler | 24/115 G |
| 3,822,052 | 7/1974 | Lange | 24/543 |
| 4,038,726 | 8/1977 | Takabayashi | 24/543 |
| 4,328,605 | 5/1982 | Hutchison et al. | 24/115 G |
| 4,453,292 | 6/1984 | Bakker | 24/115 G |
| 4,622,723 | 11/1986 | Krauss | 24/115 G |

FOREIGN PATENT DOCUMENTS

| | | |
|---|---|---|
| 59-148518 | 8/1984 | Japan . |
| 61-37810 | 3/1986 | Japan . |
| 61-55818 | 4/1986 | Japan . |
| 2131868 | 6/1984 | United Kingdom ............ 24/115 G |

*Primary Examiner*—Victor N. Sakran
*Attorney, Agent, or Firm*—James N. Videbeck

[57] ABSTRACT

A cord fastener (1) comprises a one-piece synthetic resin molding including a housing (2) having cord holes (11), a slider (3) fitting into the housing (2) and having cord holes (18), and a spring (4) for driving the slider (3). The housing (2) opens on both lateral sides (6, 7) and has at its top (5) bridges (10) interconnecting its front and back walls (8, 9).

4 Claims, 4 Drawing Sheets

FIG.8
FIG.9
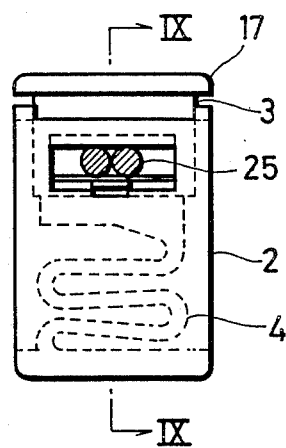
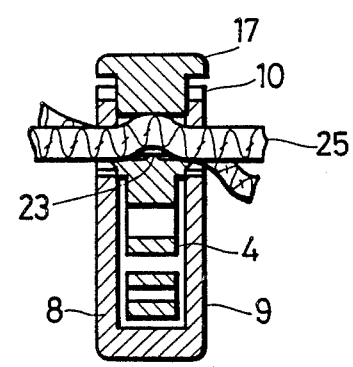
FIG.10
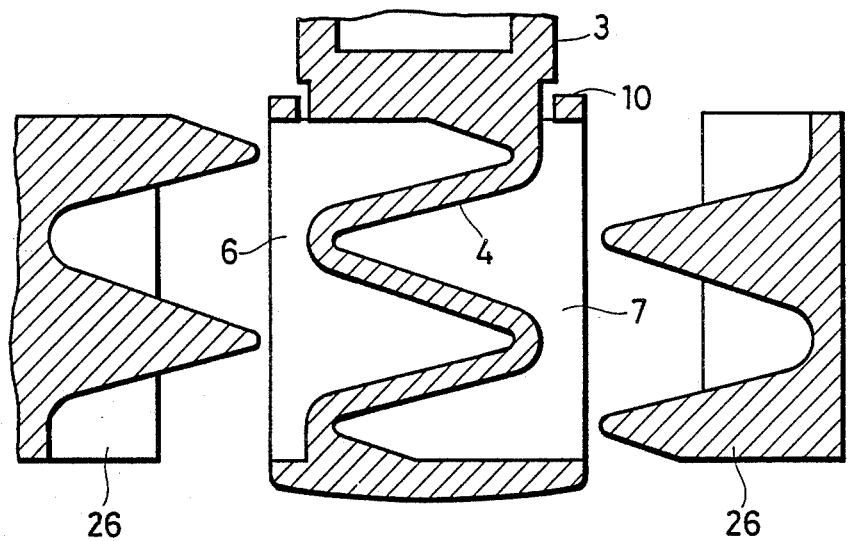

CORD FASTENER AND METHOD FOR MANUFACTURE THEREOF

BACKGROUND OF THE INVENTION

This invention relates to a cord fastener and a method for manufacture thereof. The cord fastener is used to fix the cord of a cap, bag or the like in position after adjusting the cord to a suitable length.

The fastener device commercially available today comprises three component parts, namely a housing, a slider which fits into said housing, and a spring for driving said slider.

In the conventional art, these three parts must be independently formed and, then, assembled, so that several steps are required to complete the assembly of the fastener.

To simplify this process, several techniques have been proposed.

For example, the invention described in Japanese Unexamined Kokai Patent Application No. 59-148518 discloses a one-piece molding of two parts, i.e., the slider and spring. In this invention, only two of the three component parts are molded together in one-piece, and although the assembling process is somewhat simplified, this is not sufficient.

Further, according to the devices disclosed in the Japanese Unexamined Kokai Utility Model Publication Nos. 61-37810 and 61-55818, the members corresponding to the above three component parts are one-piece molded from a synthetic resin. The Kokai disclosure is advantageous in that the three parts are formed as a unit, but the spring member is too small in capacity to serve as a fully satisfactory spring. Moreover, the Kokai disclosure shows broad lateral openings that are not attractive in appearance.

OBJECT AND SUMMARY OF THE INVENTION

This invention is fundamentally predicated on the same technical concept as that of the two latter-mentioned utility model applications. Thus, it is characterized in that the three parts of the fastener are molded as one piece from a synthetic resin. However, at the same time, the invention provides a cord fastener free of the above disadvantages and a method for improved manufacture thereof.

The cord fastener according to this invention characteristically comprises, a one-piece molding of three components: a housing having cord holes, a slider fitting into said housing and having cord holes, and a spring member for driving said slider. The housing has openings on both of its lateral sides and has at the top thereof bridging members interconnecting its front and back walls.

Preferably, the slider is provided with a pair of stoppers such that its range of movement is controlled by the cord holes of the housing.

Further, preferably a cord grip projection is formed along the cord holes of the slider.

Further, preferably, the elastic member is a zigzag-shaped spring. It may be otherwise configured, e.g., a curved semi-circular member.

The method according to this invention is a method of molding three component parts in one piece from a synthetic resin, namely, a housing having cord holes, a slider fitting into said housing and having cord holes, and an elastic member for driving the slider. More particularly, it comprises forming the housing and slider using an upper and a lower mold, and forming the elastic member using slide core molds, while forming bridging members at the top of the housing which interconnect its front and back walls.

This invention is economical in that compared with the prior art technique of molding three component parts and assembling them, these parts can be one-piece molded.

Moreover, even in comparison with the prior art technique involving one-piece molding of parts just as in this invention, this invention provides a larger-sized spring component so that the cord can be firmly fixed in position.

Furthermore, the space for forming the spring member is made smaller and provided in a lateral position, it does not affect the appearance.

BRIEF DESCRIPTION OF THE DRAWINGS

Two embodiments of this invention are described with reference to the drawings, in which:

FIG. 8 is a front elevational view showing the cord fastener after positioning of the cord and release of pressure;

FIG. 9 is a sectional view taken along the line IX—IX of FIG. 8;

FIG. 10 is a fragmentary detail sectional view illustrating the manufacturing method of this invention;

DETAILED DESCRIPTION OF THE INVENTION

Figure 1:
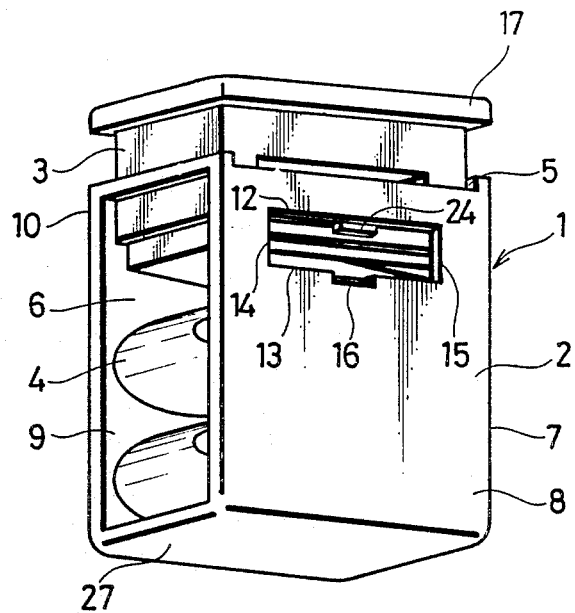
FIG. 1 is an overall perspective view showing a first embodiment of the cord fastener according to this invention.

The cord fastener 1 according to this invention is one-piece molded from a synthetic resin as aforementioned and comprises three component parts, namely, a housing 2, a slider 3 which fits snugly in the housing 2, and a spring 4 for driving the slider.

The housing 2 is configured to be a case opening at its top 5 and lateral sides 6, 7. The housing 2 is raised at its top 5 and on both lateral sides to form bridging members 10 interconnecting its front 8 and back 9. The front 8 and back 9 are also conjoined by a bottom wall 27 in addition to the bridging members 10.

The front 8 and back 9 are each provided with a cord hole 11, 11b, respectively. The cord hole 11 is substantially rectangular, its upper, lower and lateral sides being indicated at 12, 13 and 14, 15, respectively. There is a small nick 16 formed on the lower side 13.

The slider 3 fits into the open top 5 of the housing 2 and slides vertically. The slider 3 has a handle 17 at its top end. This handle 17 is expanded so that it cannot enter the housing 2.

Figure 2:
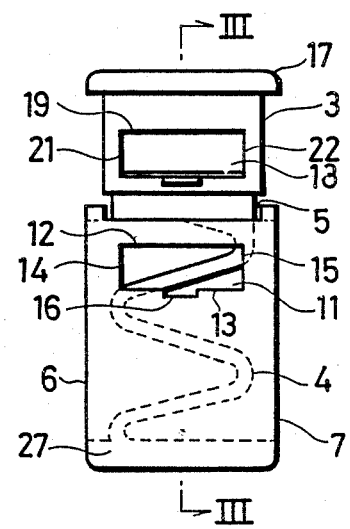
FIG. 2 is a front elevational view of the cord fastener immediately after molding.
Figure 3:
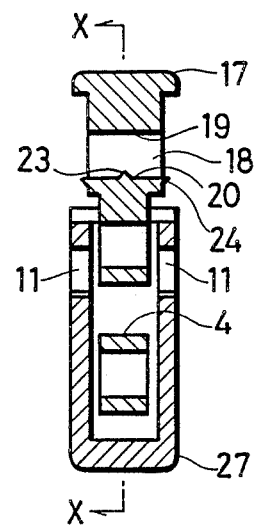
FIG. 3 is a sectional view taken along the line III—III of FIG. 2.
Figure 4:
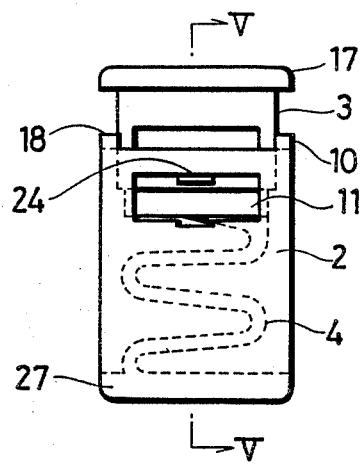
FIG. 4 is a front elevational view showing the cord fastener in spontaneous state after completion.
Figure 5:
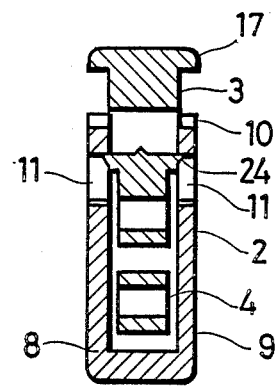
FIG. 5 is a sectional view taken along the line V—V of FIG. 4.

As illustrated in FIGS. 2 and 3 the slider 3 is centrally provided with a cord hole 18. This cord hole 18 is substantially rectangular, its upper, lower and lateral sides being indicated at 19, 20 and 21, 22, respectively. The bottom 20 is centrally provided with a cord grip projection 23. This projection 23 is shown as a single wedge in the drawing but may be constituted by a plurality of wedges. The bottom 20 extends outwardly to form a pair of stoppers 24.

The spring 4 is zigzag-configured and interposed between the bottom of the slider 3 and the bottom 27 of the housing 2.

The manner of using this device is explained with reference to FIGS. 2 through 9.

Illustrated in FIGS. 2 and 3 is the cord fastener 1 immediately after molding. As the handle 17 is pressed down from this position, the slider 3 is depressed into the position illustrated in FIGS. 4 and 5. The stoppers 24 of the slider contact the top 12 of the respective cord holes 11, 11b of the housing 2, whereby the slider 3 is stopped. This position is the basic, spontaneous condition.

Figure 6:
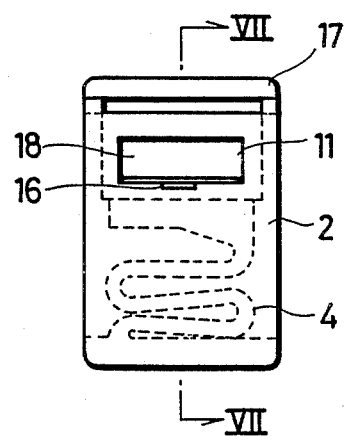
FIG. 6 is a front elevational view showing the cord fastener in pressed state.
Figure 7:
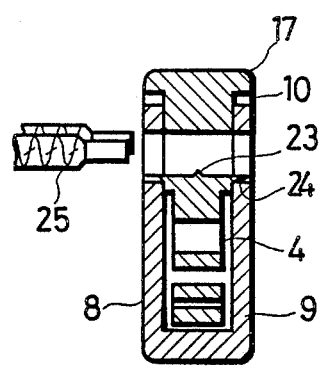
FIG. 7 is a sectional view taken along the line VII—VII of FIG. 6.

In order to fix the cord in position, the handle 17 is further pressed by hand as illustrated in FIGS. 6 and 7 to depress the slider 3 against the force of the spring 4 and thereby align the cord holes 11, 11b of the housing with the cord hole 18 of the slider 3. With this condition being maintained, the cord 25 is passed as illustrated in FIG. 7. In the drawing, two cores are shown.

After passage of the cord 25, the force applied to the slider 3 is relieved to let the spring 4 exert its pre-energization force again. The spring 4 thereupon ascends somewhat but is prevented by the intercepting cords 25 from returning to the basic position. Therefore, the cords 25 are firmly locked in position between the respective cord holes 11, 11b and 18 of the slider 3 and the housing 2. The grip projection 23 of the slider also sinks into the cords 25 to help lock them more firmly.

The method of molding the present device is explained with reference to FIG. 10. A pair of upper and lower molds (not shown) is set in a position perpendicular to the plane of the sheet to mold the housing 2 and slider 3. Simultaneously, slide core molds 26-26 are advance from both sides to mold the spring 4. The slide core molds 26-26 are pre-formed to the complementary shape of a spring.

The molding method comprising the use of slide core molds in addition to an upper and a lower mold is known. For example, slide core molds are used in molding the embodiments disclosed in the Background of the Invention. However, in the case of a device shaped like the one according to this invention, the molding process using slide core molds results in separation of the front and rear walls at top of the housing 2 unless some contrivance is introduced. To solve this problem, raised bridging members 10 are provided between the front and back walls 8 and 9 of the housing and this is a feature of this invention.

Figure 11:
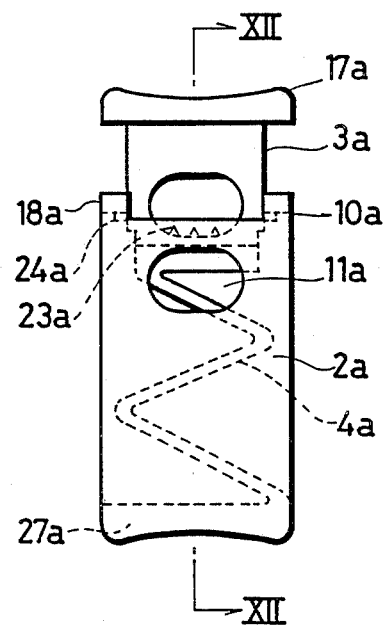
FIG. 11 is a front elevational view showing the cord fastener of a second embodiment made in accordance with the present invention spontaneous state.
Figure 12:
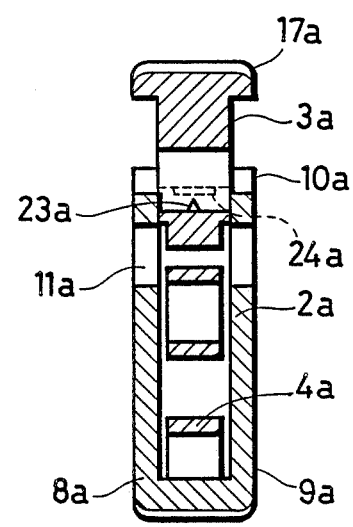
FIG. 12 is a sectional view taken along the line XII—XII of FIG. 11.

FIGS. 11 and 12 show a second embodiment of the present invention. The overall configuration is somewhat different from the first embodiment, but parts of the second embodiment having the same function as the first embodiment are shown using the same numerals with a added to them, and a description thereof is omitted.

This embodiment differs from the first embodiment in the position of the stopper 24a and the number of the grip projections 23a. The stopper 24a is provided in a pair at the right and left sides of the slider 3a instead of the front and back, and the number of the grip projections 23a of the cord hole 18a is three instead of one.

The invention may be embodied in other specific forms without departing from the spirit and essential characteristics thereof. The present embodiments are therefore to be considered in all respects as illustrative and not restrictive, the scope of the invention being indicated by the appended claims.

I claim:

1. A cord fastener comprising:
   a substantially hollow housing having front and back walls and a bottom, and having openings at the top and lateral sides and further having a pair of opposed bridging members which extend between and interconnect said front and back walls at spaced apart positions defining boundaries between opposed sides of said top opening and opposed top sides of said lateral openings, respectively, said front and back walls being spaced apart from the bottom for providing additional structural rigidity for said housing, said front and back walls being formed with cord holes for passing a cord therethrough substantially perpendicular to the planes of said front and back walls,
   a slider slidably fitting into the housing through the top opening thereof and having a cord hole positioned to be selectively alignable with said cord holes in said front and back walls, said slider being provided with a stopper means which controls the range of its movement within the housing, and
   a zig zag-shaped spring member for driving the slider within the housing,
   said housing, slider and spring member being a one-piece synthetic molding with said zig-zag shaped spring member being integrally connected adjacent the bottom thereof to said housing.

2. A cord fastener according to claim 1 wherein the cord hole of said slider is provided with a cord grip projection.

3. A cord fastener according to claim 1 wherein the movement of the slider is controlled by the stopper provided thereon, the range of movement of said stopper being within the cord holes of the housing.

4. A cord fastener according to claim 1 wherein the movement of the slider is controlled by the stopper provided thereon, the range of movement of said stopper being between the bottom and the bridging member.

* * * * *